T. W. F. SMITTEN.
SLEEVE-BUTTONS.

No. 179,969. Patented July 18, 1876.

WITNESSES:
Francis McArdle.
Alex F. Roberts

INVENTOR:
T. W. F. Smitten
BY
ATTORNEYS.

UNITED STATES PATENT OFFICE.

THOMAS W. F. SMITTEN, OF BROOKLYN, NEW YORK.

IMPROVEMENT IN SLEEVE-BUTTONS.

Specification forming part of Letters Patent No. 179,969, dated July 18, 1876; application filed April 10, 1876.

*To all whom it may concern:*

Be it known that I, THOMAS W. F. SMITTEN, of Brooklyn, county of Kings and State of New York, have invented a new and Improved Sleeve-Button, of which the following is a specification:

The invention consists in bending the shank of a disk sleeve-button to one side, and jointing to the end thereof a latch provided with a toe extending rearwardly beyond its pivot, as hereinafter described.

Figure 1:
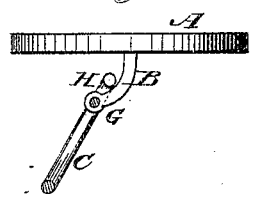
Figure 3:
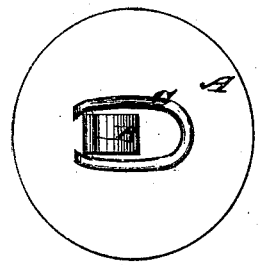
Figure 2:
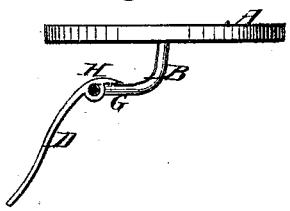
Figure 4:
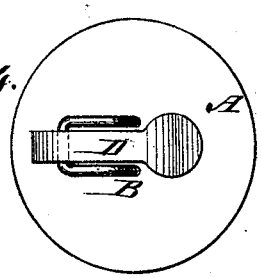

Figures 1 and 2 are side elevations of a sleeve-button with the shank contrived according to my invention, and with pivoted latches adjusted for inserting in the button-hole; Figs. 3 and 4 represent the same in back views.

Similar letters of reference indicate corresponding parts.

A represents the outer disk; B, the shank or stem; C and D, pivoted latches to fasten the button after the shank has been inserted in the button-hole. The shank is bent over to one side so as to leave no projection on the other side, as there is when the common disk-shaped back is used, and thereby has two important advantages, as compared with the disk, viz.: it offers much less obstruction in putting in the button-hole, and it is made much cheaper.

The pivoted latch has a short arm, H, beyond the pivot, to act as a toe on the cuff to prevent it from swinging open, said projection being sufficiently short to allow the latch to swing open by a little pressure when the button is to be taken out.

The shank may be made of a flat bar and the latch of a yoke-shaped wire, as in Fig. 3, or the shank may be of doubled wire and the latch of a single bar, as in Figs. 3 and 4.

Having thus described my invention, I claim as new and desire to secure by Letters Patent—

A sleeve-button, consisting of disk A, bent shank B, and pivoted latch C, having the toe H, substantially as shown and described.

THS. W. F. SMITTEN.

Witnesses:
T. B. MOSHER,
ALEX. F. ROBERTS.